W. LANGDON.
UNIVERSAL BATH TUB TRAP.
APPLICATION FILED MAR. 17, 1919.
1,317,797.
Patented Oct. 7, 1919.
2 SHEETS—SHEET 1.
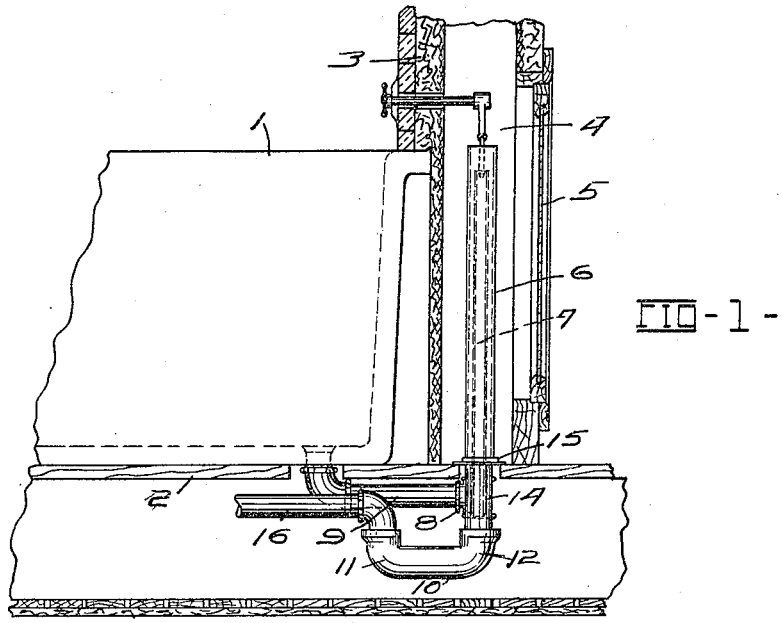
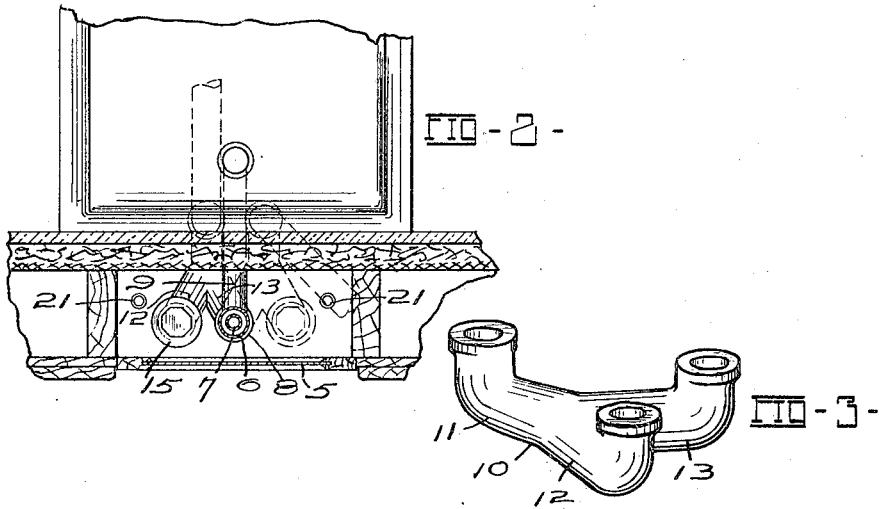
INVENTOR
William Langdon,
by
Owen, Owen & Crampton

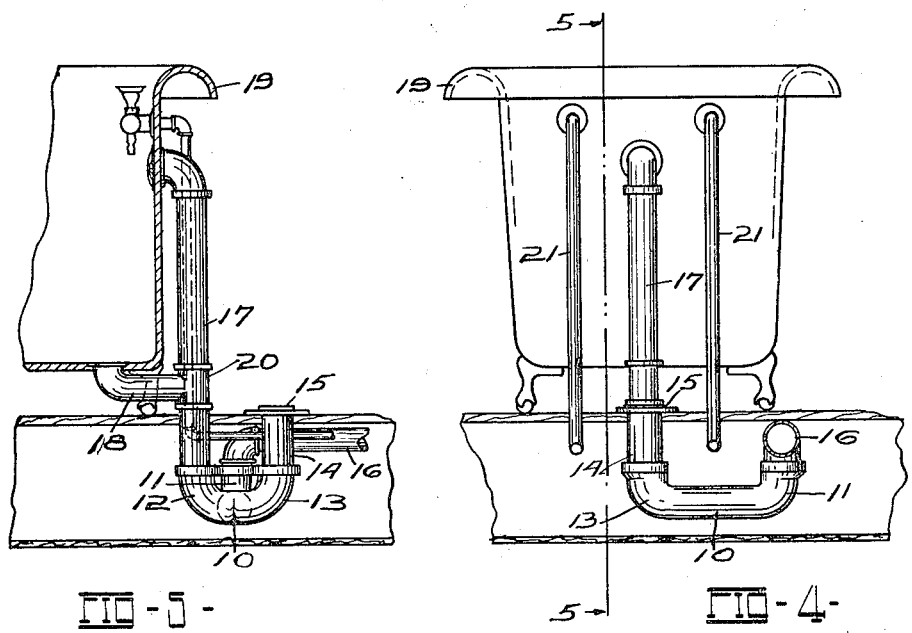

UNITED STATES PATENT OFFICE.

WILLIAM LANGDON, OF TOLEDO, OHIO.

UNIVERSAL BATHTUB-TRAP.

1,317,797.  Specification of Letters Patent.  Patented Oct. 7, 1919.

Application filed March 17, 1919. Serial No. 283,100.

*To all whom it may concern:*

Be it known that I, WILLIAM LANGDON, a citizen of the United States, and a resident of Toledo, in the county of Lucas and State of Ohio, have invented a certain new and useful Universal Bathtub-Trap; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

My invention has for its object to provide a bath tub trap that may be used for built-in tubs, particularly the built-in porcelain tub and the ordinary tub, and to provide in connection with such a bath tub trap one wherein not only the outlet of the tub will be water sealed but also one wherein the clean-out will be also efficiently sealed. It also has for its object to provide a bath trap that may be disposed in a variety of positions with reference to the waste pipe of the tub, the waste pipe of the bath trap, the cold and hot water pipes of the tub, as well as with reference to the location of the clean-out cap. It also has for its object to provide a bath trap that is so formed that the waste pipe of the bath trap may be placed near the top edge of the supporting rafter, and just below the flooring to permit the proper fall of the pipe to cause flow of the water from the bath trap and the tub. The invention also has for its object to provide a bath-trap that will permit the location of its clean-out and its connection with the waste pipe of the bath tub and the overflow pipe of the bath tub as well as the hot and cold water pipes of the bath tub within the paneled space between the sides of the wall usually found in connection with built-in porcelain tubs. It also has for its object to provide a trap that may be placed close to the fixtures, that is, without the use of intervening nipples and elbows, and one wherein the waste will drop directly into the trap.

Other objects and advantages of the invention will appear in the following description and upon examination of the drawings.

The invention may be contained in traps of different forms. I have selected a bath trap for purposes of illustration and shall describe the same hereinafter. The bath trap selected is illustrated in the accompanying drawings.

Figure 1 of the drawings illustrates a sectional view of the panel and a side view of a built-in porcelain tub and of the universal trap connected therewith. Fig. 2 is a top view of the trap and tub, the floor of the paneled space having been removed. Fig. 3 is a perspective view of the trap. Fig. 4 is an end view of the ordinary bath tub and a side view of the trap. Fig. 5 shows a sectional view taken on the line 5, 5 indicated in Fig. 4 and an end view of the trap.

1, in the figures, is the built-in porcelain tub. It is located on the floor 2 and is set into the wall 3 which is provided with the paneled space 4 located between the studding of the wall. The paneled space is closed by the door 5. Within the paneled space is located the overflow pipe 6 in which is located the outlet pipe 7 for the overflow which also forms the puppet-valve that controls the waste from the tub of the form well known in the art. The overflow pipe 6 is connected by a T 8 to the waste pipe 9 of the tub. The outlet of the T is controlled by the puppet-valve located on the end of the pipe 7 and at the lower end of the T 8. The tub 1 is connected to the waste 9.

The universal trap 10 is provided with three arms 11, 12 and 13 which radiate from the center of the trap and may be formed in the shape of a Y. The ends of the radiating portions are turned upward and are threaded to receive the three connections, namely, one for the bath tub waste, the other for the clean-out, and the other, the waste pipe. Any one of the connections may be made with any of the ends of the radiating arms or portions of the bath trap and yet the bath trap will afford a water seal for any one and all of the connections because of the length of the arms of the bath trap and because the axes of the arms are located in substantially the same plane. Inasmuch as any one of the connections may be made with any one of the arms the bath trap may be located not only in any three positions with reference to the three connections but also the bath trap may be located in any position about any one of the fixed points of connection, that is, it may be rotated or located in any position about the overflow pipe which is generally located either in line with the center of the end of the bath tub or in line with the center of the side of the bath tub and the center of the tub. This permits the location of the clean-out in any desired position and is advantageous in that it permits the location of the clean-out cap within the panel usually provided in built-in tubs and at the same time permits ready connection with the outlet of the bath trap, that is, the waste pipe of the bath trap at any point so that in case of leakage or freezing repair may be easily made. The arms radiating from a center and their axes being located in a horizontal plane and being of considerable length, and the upturned ends being short, plenty of space is afforded between the ceiling and the floor by the joists without crowding of the pipes and their connections and yet at the same time places the outlet or waste or sewer pipe at a point near the floor at the end where it is connected with the bath trap and thus permits an extending fall of the waste water which is particularly of advantage when the waste pipe is to be connected with a drain pipe located across the bath room, a condition which invariably exists in bath room plumbing. If the connection with the bath tub through the T 8, the waste pipe 9 and the overflow pipe 6 is made with the arm 13, the clean-out pipe 14 may be connected with the arm 12. The clean-out pipe 14 is closed with a cap 15. This locates the cap 15 within the area of the floor of the paneled space 4 and is readily accessible for cleaning the trap. If the clean-out pipe 14 is connected with the arm 12, the waste or sewer pipe 16 may be connected with the arm 11. This may be used when the pipe 16 is to be connected with the drain in a line of direction that passes beneath the bath tub. However, the trap 12 may be swung around the T 8 and still locate the clean-out cap 15 within the area of the floor of the paneled space 4 and locate the arm 11, with which the pipe 16 is connected, at any position and so as to place the pipe 16 in a line of direction which extends away from the bath tub, or the T 8 may be connected with the arm 12 as shown in the dotted position indicated in Fig. 2 and the clean-out located on the other side of the overflow pipe 6. This gives a wide latitude of selection of positions for the bath trap notwithstanding the limitation of the risers, such as the hot and cold water pipes, the position of the joists, etc., in order that a proper sealing connection may be made with the three pipes leading to and from the trap.

In this ordinary tub it is found desirable to locate the clean-out cap 15 directly opposite the overflow pipe 17. At any rate such an arrangement is somewhat symmetrical and gives a better appearance to the plumbing. In the arrangement shown in Figs. 4 and 5, the waste pipe 18 of the ordinary tub 19 is connected through a T 20 to the arm 12 of the bath trap while the clean-out pipe 14 is connected to the arms 13 of the trap. The clean-out pipe 14, however, may be connected with the arm 11 and turned in any position and the waste pipe 16 connected with the arm 13. The connection may thus be varied as may be desired, or as may be necessary, because of location of the joists and of the hot and cold water pipes that lead to the bath tub, and yet notwithstanding any such connections that may be made, the water seal of the outlets and the inlets from the bath trap will be through the arms of the bath trap which are of sufficient length to warrant a perfect water seal, so that notwithstanding any connections that may be made, the sewer gas will not be permitted to enter the room either through the bath tub waste or through the clean-out pipe.

I claim:—

A bath tub trap having three arms of substantially the same length and arranged to form a Y and having upturned ends, the axes of the arms located in substantially the same plane, the diameter of the arms and ends being substantially the same throughout, the end of the trunk of the Y forming the outlet and the ends of the branches of the Y forming the inlet and cleanout of the trap.

In testimony whereof I have hereunto signed my name to this specification.

WILLIAM LANGDON.

Copies of this patent may be obtained for five cents each, by addressing the "Commissioner of Patents, Washington, D. C."